Patented May 13, 1952

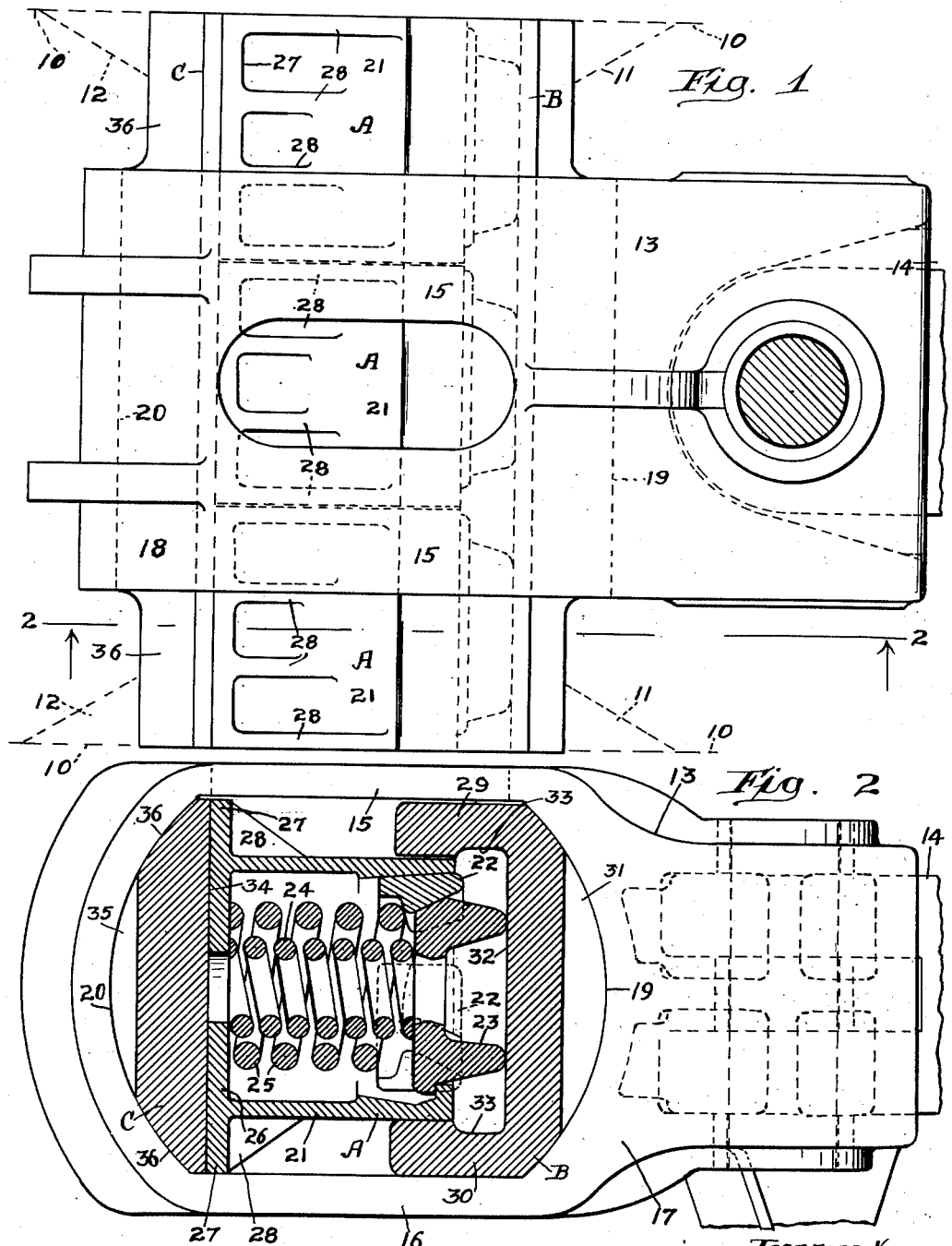

2,596,262

UNITED STATES PATENT OFFICE 2,596,262

DRAFT RIGGING

Harvey J. Lounsbury, Glen Ellyn, Ill., assignor to W. H. Miner, Inc., Chicago, Ill., a corporation of Delaware Application November 1, 1945, Serial No. 626,086

3 Claims. (Cl. 213—49)

This invention relates to improvements in draft riggings for railways, and more particularly for railway locomotives.

One object of the invention is to provide a railway draft rigging of high shock absorbing capacity, wherein the high capacity is obtained by the provision of a plurality of friction shock absorbers which are compressed simultaneously.

A more specific object of the invention is to provide a railway draft rigging of high capacity, comprising a plurality of friction shock absorbing units, each including a friction casing and a friction clutch, front and rear followers between which the shock absorbing units are compressed, and a yoke enclosing the followers and shock absorbing units, wherein the parts are so designed that the shock absorbing units are adequately supported to maintain the same in horizontal alignment, thus assuring proper and efficient operation of each individual unit.

Other objects of the invention will more clearly appear from the description and claims hereinafter following.

In the drawing forming a part of this specification, Figure 1 is a top plan view of my improved draft rigging. Figure 2 is a longitudinal, vertical sectional view, corresponding substantially to the line 2—2 of Figure 1.

In said drawing, the side walls of the usual draft gear pocket are shown in dotted lines in Figure 1, said walls being indicated by 10—10. As is common practice, the walls 10—10 are provided with front and rear stop lugs 11—11 and 12—12.

My improved draft rigging comprises broadly three friction shock absorbing units A—A—A; a front follower B; and a rear follower C.

The friction shock absorbing units A—A—A and the followers B and C are disposed within a yoke 13 of well-known design, having the coupler, not shown, pivotally connected thereto, the inner end of the shank of the coupler being shown and indicated by 14. The yoke 13 has top and bottom, lengthwise extending, horizontal arms 15 and 16 connected by front and rear, vertical sections 17 and 18 defining a pocket. The front and rear, vertical sections 17 and 18 present front and rear, interior walls 19 and 20 which are concavely curved in vertical direction, as shown, being of cylindric form.

The three friction shock absorbing units A—A—A are of identical design, each unit being of a well-known type including a friction casing 21 of hexagonal cross section, a friction clutch comprising three friction shoes 22—22—22 and a central wedge block 23 slidable within the casing, and inner and outer coil springs 24 and 25 within the casing yieldingly opposing inward movement of the clutch. In the expanded condition, that is, the normal full release position of the mechanism, the wedge and shoes of each shock absorbing unit project outwardly beyond the casing, as clearly shown in Figure 2. Each friction casing 21 is closed at its rear end by a transverse vertical wall 26 which, in carrying out my improvements, is extended vertically outwardly beyond the top and bottom walls of the casing, and also beyond the side walls, thereby providing flanges 27—27 which, together with the rear wall, forms an integral base member of rectangular, platelike shape. This plate member is preferably reenforced by ribs 28—28 extending lengthwise of the casing and formed integral with the flanges and the side walls of the casing.

The front follower B is in the form of a relatively heavy, rectangular plate of elongated form, having inwardly or rearwardly projecting, top and bottom, horizontal flanges 29 and 30 extending the entire width of the follower. The rectangular follower is of an overall width corresponding to the overall width of the three friction shock absorbing units A—A—A arranged side by side, and of such a height as to fit between the top and bottom arms 15 and 16 of the yoke. At the forward side, the follower B is provided with an enlarged or bulged mid portion 31, which has a convexly curved or rounded front face seated against the curved front wall 19 of the yoke. At opposite sides of the bulged or enlarged portion 31, which portion corresponds in width to the yoke, the follower B presents substantially flat, vertical faces, except at the top and bottom corner portions thereof, which are rounded off to correspond with the curvature of the front wall 19 of the pocket of the yoke 13.

The flanges 29 and 30 are vertically spaced apart to accommodate the front ends of the casings 21—21—21 therebetween and loosely embrace the same, that is, with sufficient clearance to permit relative lengthwise movement of the follower B and the casings. The inner or rear side of the follower B presents a substantially flat, vertical face 32 on which the front ends of the wedge blocks 23—23—23 of the three friction shock absorbing units are adapted to bear. Adjacent the wall 19, the inner sides of the flanges 29 and 30 are undercut or recessed, as indicated at 33—33, to provide additional clearance to facilitate relative sliding movement of the follower and friction casings.

The rear follower C is also in the form of a relatively heavy, rectangular plate, corresponding in width to the overall width of the three shock absorbing units A—A—A, placed side by side, and of an overall height corresponding to the vertical height of the yoke pocket. The follower C presents a substantially flat, vertical front face 34 on which the rear ends or base portions of the three shock absorbing units are adapted to bear. At the rear side thereof, the follower C is provided with a centrally bulged or enlarged portion 35, similar to the bulged portion 31 of the follower B, which portion 35 bears on the concavely curved, rear wall 29 of the pocket of the yoke. The follower C also has its rear upper and lower corners rounded similarly to the follower B, as indicated at 36—36.

In the applied condition of my improved draft rigging, the three shock absorbing units A—A—A are arranged side by side in side contact with each other and with the vertical edges of the base members in edge to edge engagement. The followers B and C are arranged transversely within the yoke, the follower C bearing on the base portions or rear ends of the shock absorbing units and the follower B bearing on the wedge members 23—23—23 of said units, with the flanges 29 and 30 of said front follower B overhanging the front ends of the casings 21—21—21 of said units to support the same and hold them in horizontal alignment.

As will be understood by those skilled in this art, the followers B and C cooperate with the stop lugs 11 and 12 in the usual manner during buff and draft action of the rigging.

As will be seen upon reference to Figure 1, the parts are so designed and proportioned that the rear ends of the shock absorbing units A—A—A are maintained in horizontal alignment by the top and bottom arms 15 and 16 of the yoke, the outer two units A—A at opposite sides of the central unit being partly overlapped by the sides of the yoke, thus holding these units in position by engagement of the yoke arms with the top and bottom edges of the rectangular base members of said units.

I claim:

1. In a railway draft rigging, the combination with a yoke having a pocket defined by top and bottom arms and spaced front and rear walls; of front and rear followers within said pocket; and a group of friction shock absorbing units arranged side by side and extending lengthwise between said followers, the units at opposite sides of said group being laterally overlapped by the arms of said yoke, each unit including a friction casing having a rectangular base portion and a spring resisted friction clutch slidingly telescoped within the casing, said arms embracing the base portions of said units therebetween to hold the same against vertical displacement, said front follower having rearwardly projecting, horizontally disposed, top and bottom flanges overhanging the front ends of all of the casings of said units in embracing slidable relation to hold said front ends of said units against vertical displacement.

2. In a railway draft rigging, the combination with a yoke having a pocket defined by top and bottom arms and spaced, front and rear walls; of front and rear followers within said pocket; and a group of friction shock absorbing units arranged side by side and extending lengthwise between said followers, each unit including a friction casing and a spring resisted friction clutch comprising friction shoes and a wedge block, said wedge block normally projecting from the front end of the casing, said casing having a rectangular base flange at the rear end, the base flange of each casing bearing on the rear follower, the base flanges of all of said shock absorbing units of said group being engaged by and confined against vertical displacement between said top and bottom arms of the yoke, said front follower engaging the wedge blocks of said shock absorbing units and having top and bottom, horizontal, rearwardly projecting flanges overhanging the front ends of the friction casings of all of said units in embracing slidable relation to confine the same against vertical displacement.

3. In a railway draft rigging, the combination with a yoke having a pocket defined by top and bottom arms and spaced, front and rear, concavely curved walls; of front and rear followers within said pocket, said followers having convexly curved bearing projections seated against said concavely curved walls; and a group of friction shock absorbing units arranged side by side and extending lengthwise between said followers, each unit including a friction casing and a spring resisted friction clutch comprising friction shoes and a wedge block, said wedge block normally projecting from the front end of the casing, said casing having a rectangular base flange at the rear end, the base flange of each casing bearing on the rear follower, the base flanges of all of said shock absorbing units of said group being engaged by and confined against vertical displacement between said top and bottom arms of the yoke, said front follower engaging the wedge blocks of said shock absorbing units and having top and bottom, horizontally, rearwardly projecting flanges overhanging the front ends of the friction casings of all of said units in embracing slidable relation to confine the same against vertical displacement.

HARVEY J. LOUNSBURY.

REFERENCES CITED

The following references are of record in the file of this patent:

UNITED STATES PATENTS

| Number | Name | Date |
| --- | --- | --- |
| 1,107,275 | Farmer | Aug. 18, 1914 |
| 1,125,109 | Johnson | Jan. 19, 1915 |
| 1,156,092 | O'Connor | Oct. 12, 1915 |
| 1,250,493 | O'Connor | Dec. 18, 1917 |
| 1,290,307 | O'Connor | Jan. 7, 1919 |
| 1,301,946 | Johnson | Apr. 29, 1919 |
| 1,303,338 | Lewis | May 13, 1919 |
| 1,307,313 | O'Connor | June 17, 1919 |
| 1,344,979 | Brown | June 29, 1920 |
| 2,238,220 | Gallagher | Apr. 15, 1941 |
| 2,399,110 | Geiger | Apr. 23, 1946 |